United States Patent
Spiel et al.

(10) Patent No.: US 10,253,946 B2
(45) Date of Patent: Apr. 9, 2019

(54) TECHNIQUES TO REDUCE LIGHT BLEED FOR ELECTRONIC DEVICE ASSEMBLIES

(71) Applicant: Cisco Technology, Inc., San Jose, CA (US)

(72) Inventors: Seth Spiel, San Francisco, CA (US); Matthew Cho, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 295 days.

(21) Appl. No.: 14/940,038

(22) Filed: Nov. 12, 2015

(65) Prior Publication Data

US 2017/0138573 A1    May 18, 2017

(51) Int. Cl.
   *F21V 3/06*    (2018.01)
   *H05K 5/00*    (2006.01)

(52) U.S. Cl.
   CPC ........... *F21V 3/062* (2018.02); *H05K 5/0017* (2013.01)

(58) Field of Classification Search
   CPC ..... F21V 15/01; F21V 3/0436; F21Y 2101/02
   USPC ..................... 362/311.01, 362, 367
   See application file for complete search history.

(56) References Cited

U.S. PATENT DOCUMENTS

| | | | | |
|---|---|---|---|---|
| 7,834,752 B2* | 11/2010 | Kuvantrarai | ............. | B60Q 1/44 340/468 |
| 2007/0240346 A1* | 10/2007 | Li | ............. | G09F 13/20 40/544 |
| 2007/0263380 A1* | 11/2007 | Hamar | ............. | F21V 33/006 362/153 |
| 2009/0257241 A1* | 10/2009 | Meinke | ............. | B60Q 1/2669 362/546 |
| 2014/0063784 A1* | 3/2014 | Muiter | ............. | G09F 19/12 362/97.1 |
| 2015/0062867 A1* | 3/2015 | Chang | ............. | H04M 19/048 362/23.14 |
| 2015/0077975 A1* | 3/2015 | Brown | ............. | F21V 33/008 362/92 |
| 2015/0117059 A1* | 4/2015 | Chun | ............. | G02B 6/0045 362/612 |

* cited by examiner

*Primary Examiner* — Laura Tso
(74) *Attorney, Agent, or Firm* — Polsinelli PC

(57) ABSTRACT

Techniques to reduce light dissipation (e.g., light bleed) for electronic device assemblies. According to one embodiment, the techniques include forming a housing for a device from a plastic material. The housing defines an area of permissible light transmission from an interior portion of the housing through an exterior portion of the housing to provide one or more visual notifications for the device. The techniques further include forming a light dissipation layer from the plastic material proximate the area of permissible light transmission to inhibit light propagation through the housing outside the area of permissible light transmission.

20 Claims, 10 Drawing Sheets

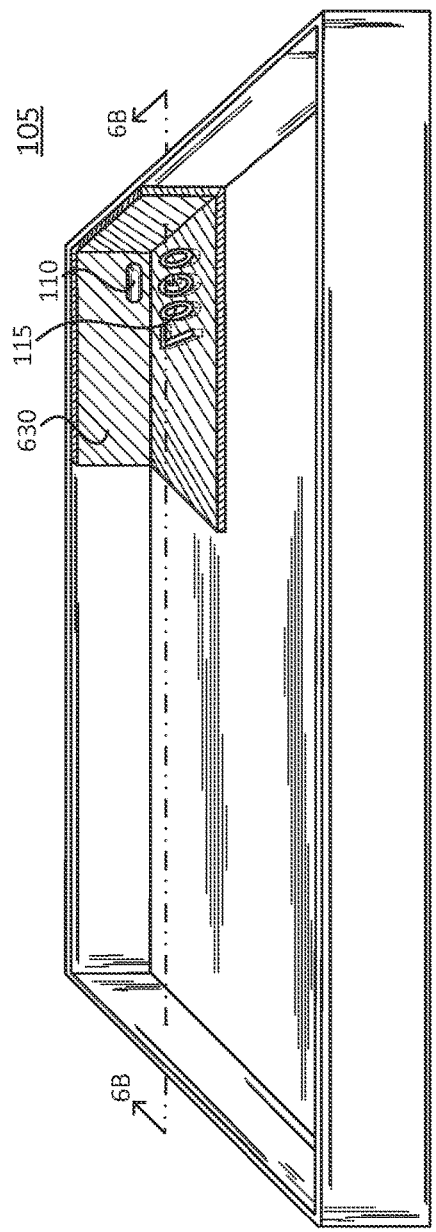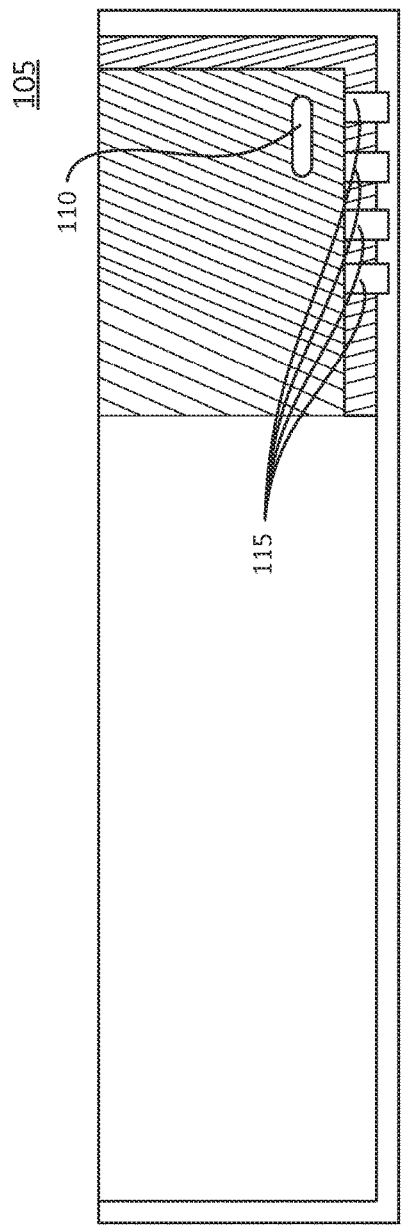

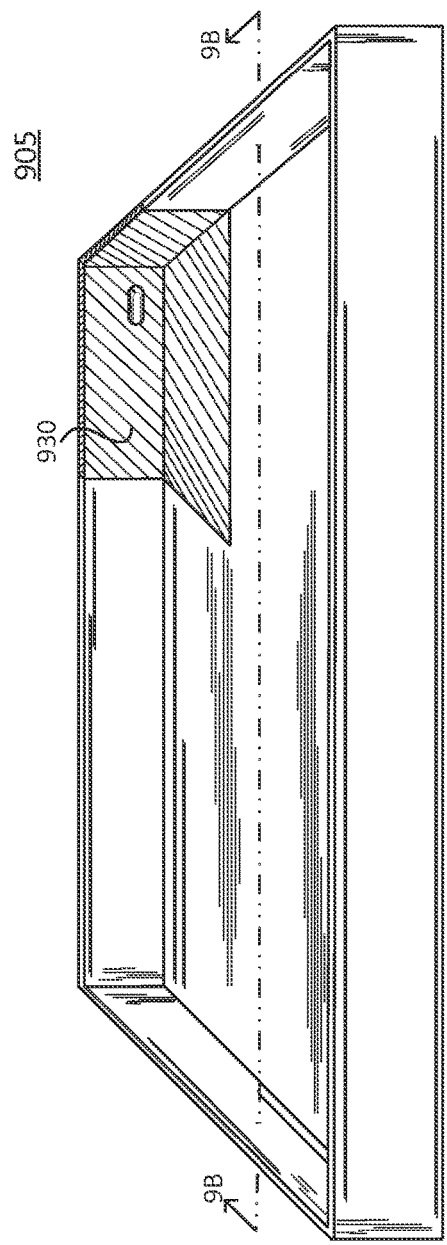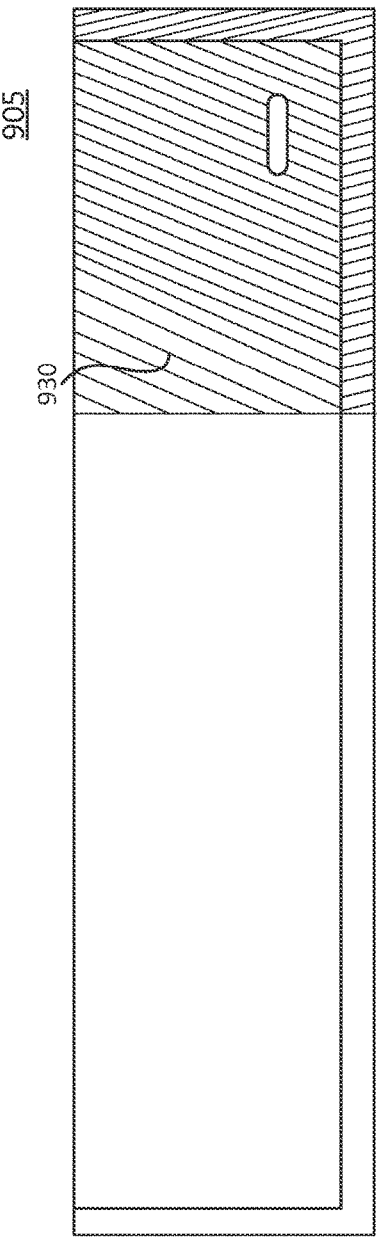

US 10,253,946 B2

TECHNIQUES TO REDUCE LIGHT BLEED FOR ELECTRONIC DEVICE ASSEMBLIES

TECHNICAL FIELD

The present disclosure relates generally to electronic devices, and more particularly to visual notifications for electronic device assemblies.

BACKGROUND

Modern electronic devices may include one or more visual notifications or indicators such as lights that communicate device information such as health, status, and the like, to an operator or user. For example, many electronic devices employ one or more Light Emitting Diodes (LEDs) to provide such visual notifications.

However, incorporating LEDs in the electronic devices presents unique challenges. For example, one of these challenges includes directing or guiding light emitted from an LED disposed inside a respective device to an appropriate egress area for external display. Some conventional solutions to guide light emitted from the LED employ a light pipe.

Light pipes are typically transparent members that carry or guide light in a specified direction. With respect to LEDs for electronic devices, one end of the light pipe is positioned next to or proximate the LED while an opposing end of the light pipe is positioned next to or proximate the egress area. Operatively, light emitted by the LED is transmitted through the light pipe to the egress area for external display (e.g., one or more visual notifications). However, light emission losses are inherently associated with light pipes (e.g., due to absorption, scattering, defects in design, etc.), which prevents some portions of the light emitted from the LED from reaching the egress area. In order to account for such light emission loss (as well as ambient lighting conditions of the electronic device, etc.), high lumen LEDs are often employed in the electronic devices. However, high lumen LEDs, present additional challenges—e.g., high lumen LEDs can emit light over a large ambient area around the LED (e.g., inside the device). In turn, light emission inside the device can cause undesirable light transmission such as light bleed (e.g., unwanted light dissipation) through portions of a device housing. Such light bleed may in aberrations to visual notifications (e.g., blurring, etc.).

Conventional approaches that attempt to mitigate light bleed in electronic devices often prove difficult to control and manage, and usually involve complex and expensive manual processing (manually taping high lumen LEDs and/or light pipes with opaque paper/tape/foam/plastic/etc.).

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 6A is an isometric perspective view of the top portion of the device assembly shown in FIG. 2, showing a light dissipation layer;

FIG. 6B is a cut sectional view of the top portion of the device assembly shown in FIG. 6A, viewed at cut lines 6B-6B, showing a negative mask;

FIG. 9A is an isometric perspective view of a top portion of an device, showing a light dissipation layer formed integral with the top portion, according to another embodiment of this disclosure;

FIG. 9B is a cut sectional view of the top portion of the device assembly shown in FIG. 9A, viewed at cut lines 9B-9B.

DESCRIPTION OF EXAMPLE EMBODIMENTS

Overview

According to one or more embodiments of the disclosure, techniques provided herein reduce unwanted light transmission such as light bleed for electronic device assemblies. For example, the techniques may include forming a housing for a device from a plastic material where the housing defines an area of permissible light transmission from an interior portion of the housing through an exterior portion of the housing to provide one or more visual notifications for the device. The techniques may further include forming a light dissipation layer from the plastic material proximate the area of permissible light transmission to inhibit light propagation through the housing outside the area of permissible light transmission (e.g., light bleed).

Description

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

As used herein, the terms "above", "below", "front", "back", "top", "bottom", "side", "short", "long", "up", "down", and words of similar import are merely for ease of description and refer to an orientation and/or relative direction of components as shown in the figures. It should be understood that various orientations of the components described herein is within the scope of the present disclosure.

As discussed above, light sources (e.g., Light Emitting Diodes (LEDs)) that provide visual notifications for electronic devices may also result in unwanted light transmission/dissipation (e.g., light bleed). Accordingly, the techniques disclosed herein inhibit, attenuate, dissipate, block, or otherwise mitigate this unwanted light transmission/dissipation in electronic devices.

Figure 1:
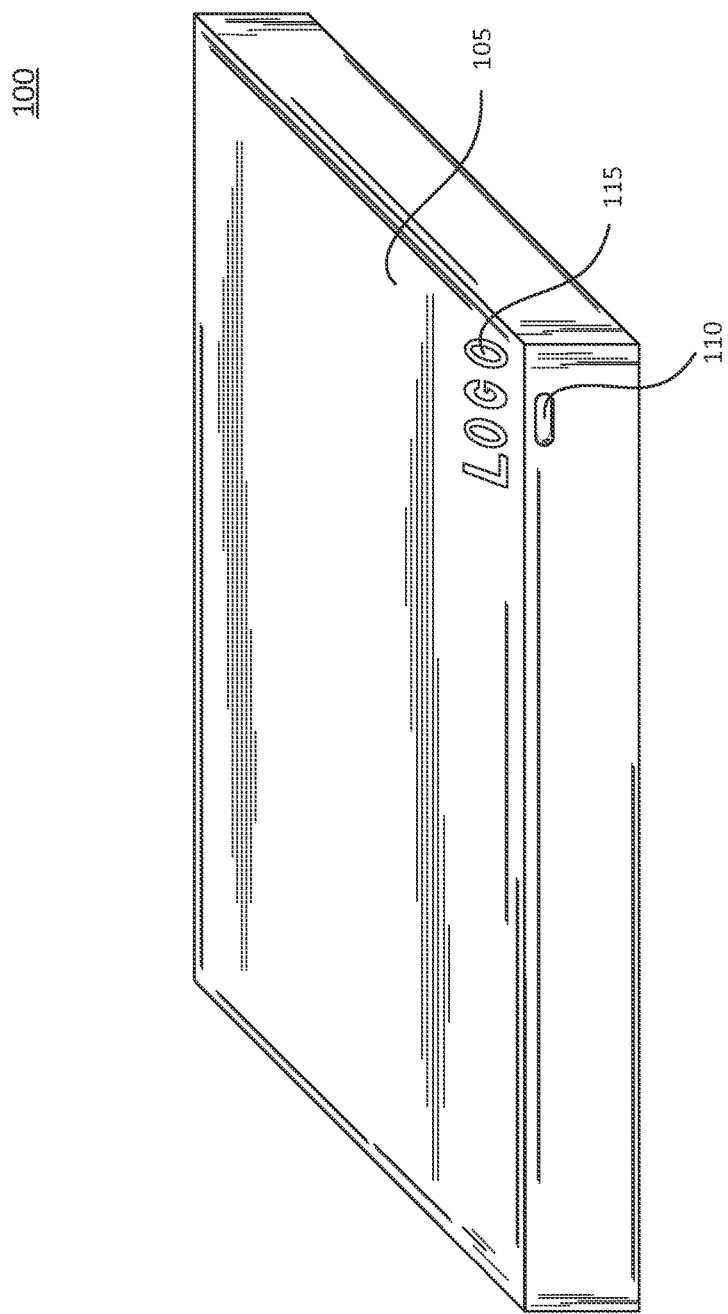
FIG. 1 is an isometric perspective view of an electronic device assembly according to one embodiment of this disclosure.

In particular, referring to the drawings, FIG. 1 is an isometric perspective view of an electronic device assembly 100, generally viewed from an exterior front side of device assembly 100, according to one embodiment of this disclosure. Device assembly 100 can represent any number of electronic device assemblies that include visual notifications for a user or operator. In addition, certain configurations (e.g., dimensions, sizes, etc.) of device assembly 100 are shown for purposes of illustration and discussion, not limitation. Any number of configurations can be employed within the spirit and scope of this disclosure.

Device assembly 100 includes a housing comprising a top portion 105 and a bottom portion (not shown). As shown, in FIG. 1, only top portion 105 is illustrated. Preferably, the housing is formed from a plastic material (e.g., polycarbonate plastics, thermo-plastics, polyethylene terephthalate, high/low density polyethylene, polyvinyl, polypropylene, other plastic resins (e.g., C28000, CS9610, ATX200, and the like)), etc.), as is appreciated by those skilled in the art.

In addition, the housing—here, top portion 105—defines an egress portion 110 or an area for permissible light transmission. As discussed in greater detail below, egress portion 110 defines an area of permissible light transmission and permits or allows light transmission there-through. As shown, egress portion 110 is defined by a gap or an opening in top portion 105 that permits light transmission there-through. Notably, visual notifications from of light transmission through the housing typically communicate information regarding health, status, etc., of the device assembly 100 to a user or operator.

Still referring to FIG. 1, device assembly 100 also includes an additional egress portion—here, an egress portion 115 (e.g., shown as a "LOGO"). Here, egress portion 115 is defined by an area of a lower density of plastic material and/or an area of reduced thickness of the plastic material in top portion 105 (e.g., relative to an average density or average thickness of the plastic material for top portion 105). Such area of lower density or reduced thickness permits light transmission according to a predetermined pattern (LOGO). Operatively, a light source (not shown) disposed inside the housing emits light that dissipates through housing (e.g., top portion 105) according to egress portion 115 to illuminate the predetermined pattern of egress portion 115. It is appreciated that egress portion 115 can define any pattern, company logo, other designs, numbers, letters, and the like. Further, it is also appreciated that while egress portion 110 is defined by a gap and egress portion 115 is defined by the area of reduced thickness in the plastic material, such gap and/or area of reduced thickness are interchangeable, and may even be used in combination to provide visual notifications.

Figure 2:
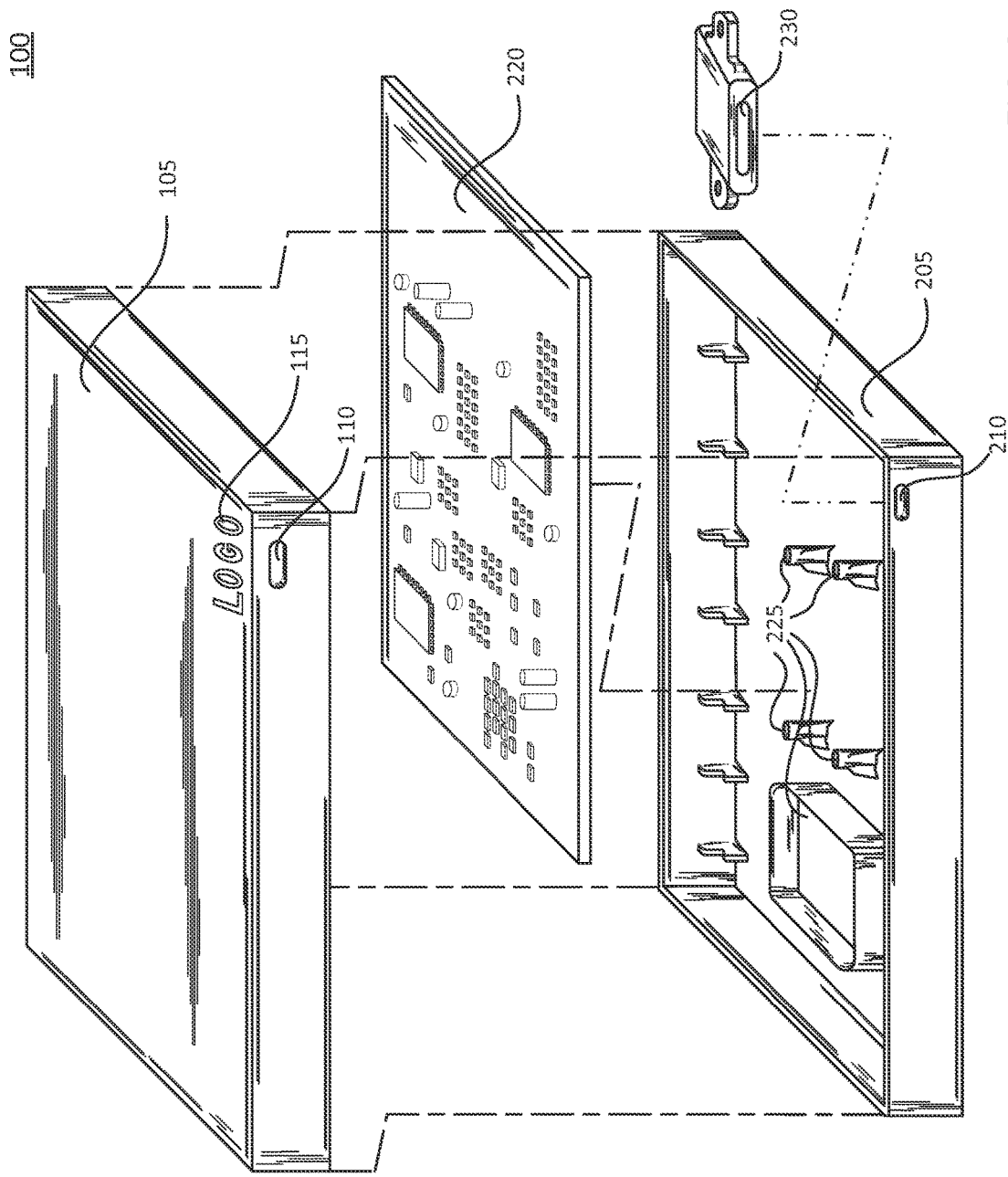
FIG. 2 is an exploded isometric perspective view of the device assembly shown in FIG. 1, showing a top portion of a housing, and a bottom portion of the housing.

FIG. 2 is an exploded isometric perspective view of device assembly 100, generally viewed from an exterior front side. As discussed above, the housing of device assembly 100 includes top portion 105 as well as a corresponding bottom portion—here, a bottom portion 205. Bottom portion 205, like top portion 105, also defines an egress portion 210. Egress portion 210 corresponds to egress portion 110 of top portion 105 to permit or allow light transmission through the housing. In particular, egress portion 210 and egress portion 110 cooperate define an area of permissible light transmission—here, from an interior of bottom portion 205 through an exterior of top portion 105.

Device assembly 100 also includes various electronic components 220 disposed within the housing, which are secured to the housing by one or more mounts 225 defined by bottom portion 205.

A light source 230 disposed within device assembly 100 operatively emits light to provide visual notifications for device assembly 100. Light source 230 is also secured to bottom portion 205 by one or more mounts 225. Preferably, mounts 225 secure light source 230 proximate egress portion 210, egress portion 110, and also proximate egress portion 115. Light source 230 typically includes one or more LEDs, light guides, light pipes, and the like. With respect to the visual notifications, light source 230 emits light that propagates through the housing (e.g., bottom portion 205/top portion 105) according to the area of permissible light transmission as defined by the egress portions. More specifically, light source 230 guides light emitted from the one or more LEDs to egress portion 210, egress portion 110, and egress portion 115 for external display. Notably, light source 230 may emit light according to a sequence or pattern. For example, the light source 230 may emit light at a particular frequency (e.g., steady, alternating, etc.), in a particular color (e.g., red, green, blue, etc.), and the like.

However, as discussed above, light source 230 may emit light in a large ambient area, causing unwanted light transmission/dissipation such as light bleed outside of egress portion 210, egress portion 110, and egress portion 115. For example, certain plastic materials (e.g., selected for thermal flow, color, aesthetics, and the like) may prove too translucent and sensitive to unwanted light dissipation or light bleed. Techniques to inhibit or attenuate such unwanted light transmission/dissipation are particularly illustrated in FIG. 3.

Figure 3:
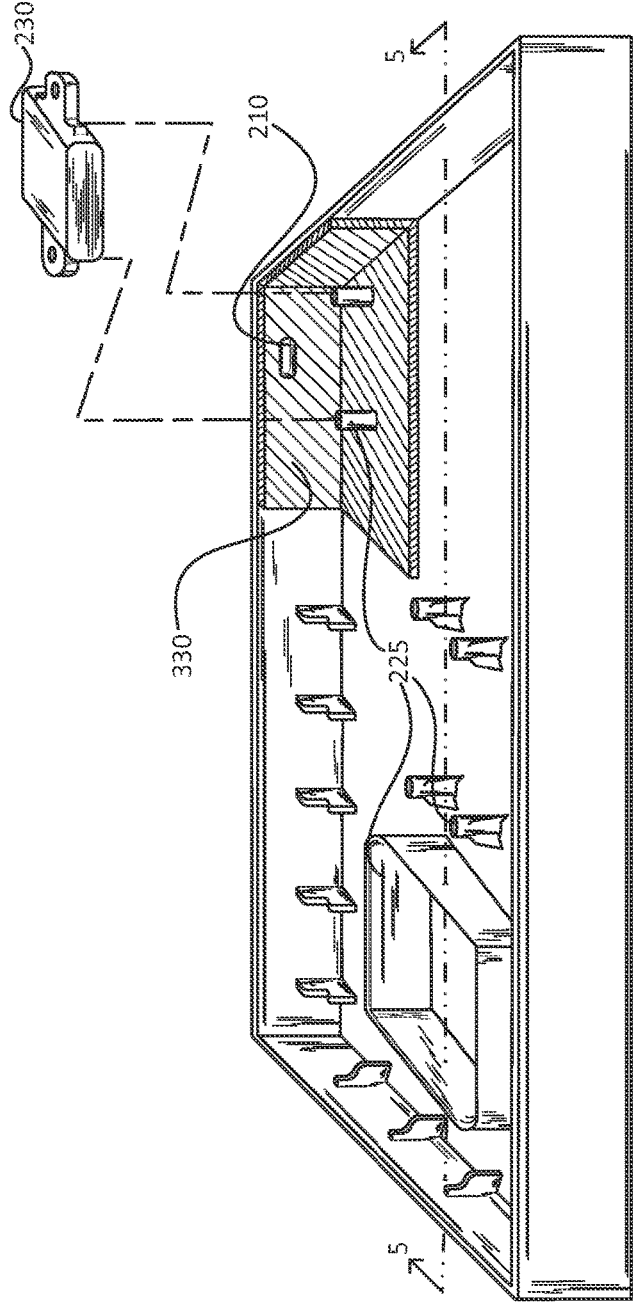
FIG. 3 is an isometric perspective view of the bottom portion of the device assembly shown in FIG. 2, showing a light dissipation layer.

FIG. 3 is an isometric perspective view of bottom portion 205, showing a light dissipation layer 330. Light dissipation layer 330 inhibits light propagation (e.g., light bleed, etc.) outside of permissible light transmission areas (e.g., defined by egress portions) through the housing of device assembly 100.

As shown, light dissipation layer 330 is an additional layer of plastic material disposed proximate egress portion 210. Moreover, light dissipation layer 330 substantially surrounds egress portion 210. Light dissipation layer 330 blocks, attenuates, dissipates, or otherwise inhibits light propagation through the housing of device outside of the permissible light transmission areas—here, outside of egress portion 210.

Light dissipation layer 330 is preferably dimensioned according the area of unwanted or undesirable light propagation through the housing (e.g., outside the area of permissible light transmission). As is appreciated by those skilled in the art, the area of unwanted light propagation through the housing can be affected by a type of plastic material, an opacity of plastic material, a luminosity of the light source 230—e.g., larger area for a high or bright luminosity for light source 230, and/or a smaller area for a low or dim luminosity for light source 230, and the like.

According to some embodiments, light dissipation layer 330 is preferably formed from a plastic material having a high opacity to facilitate light absorption or light dissipation. For example, the opacity of light dissipation layer 330 may be greater than an opacity for other parts of the housing (e.g., bottom portion 205 and/or top portion 105). In operation, top portion 105 and bottom portion 205 may be formed from a plastic material having a first (e.g., low) opacity. One or more pigments can be introduced in the plastic material to increase its opacity. Light dissipation layer 330 can be formed from the plastic material having a second (e.g., high) opacity. Alternatively (or in addition), light dissipation layer 330 may be formed from a different type of plastic material altogether (e.g., different from the plastic material forming the housing). Such different type of plastic material can include a higher opacity than the plastic material used to form the housing.

In other embodiments, the plastic material forming light dissipation layer 330 can be the same opacity as the housing. In such other embodiments, light dissipation layer 330 may have a specified thickness and/or include a specified number of layers to properly inhibit unwanted light propagation through the housing. Further still, it is also appreciated that combinations of varying thickness, density, and opacity can be used to facilitate light absorption or light dissipation by light dissipation layer 330.

Figure 4:
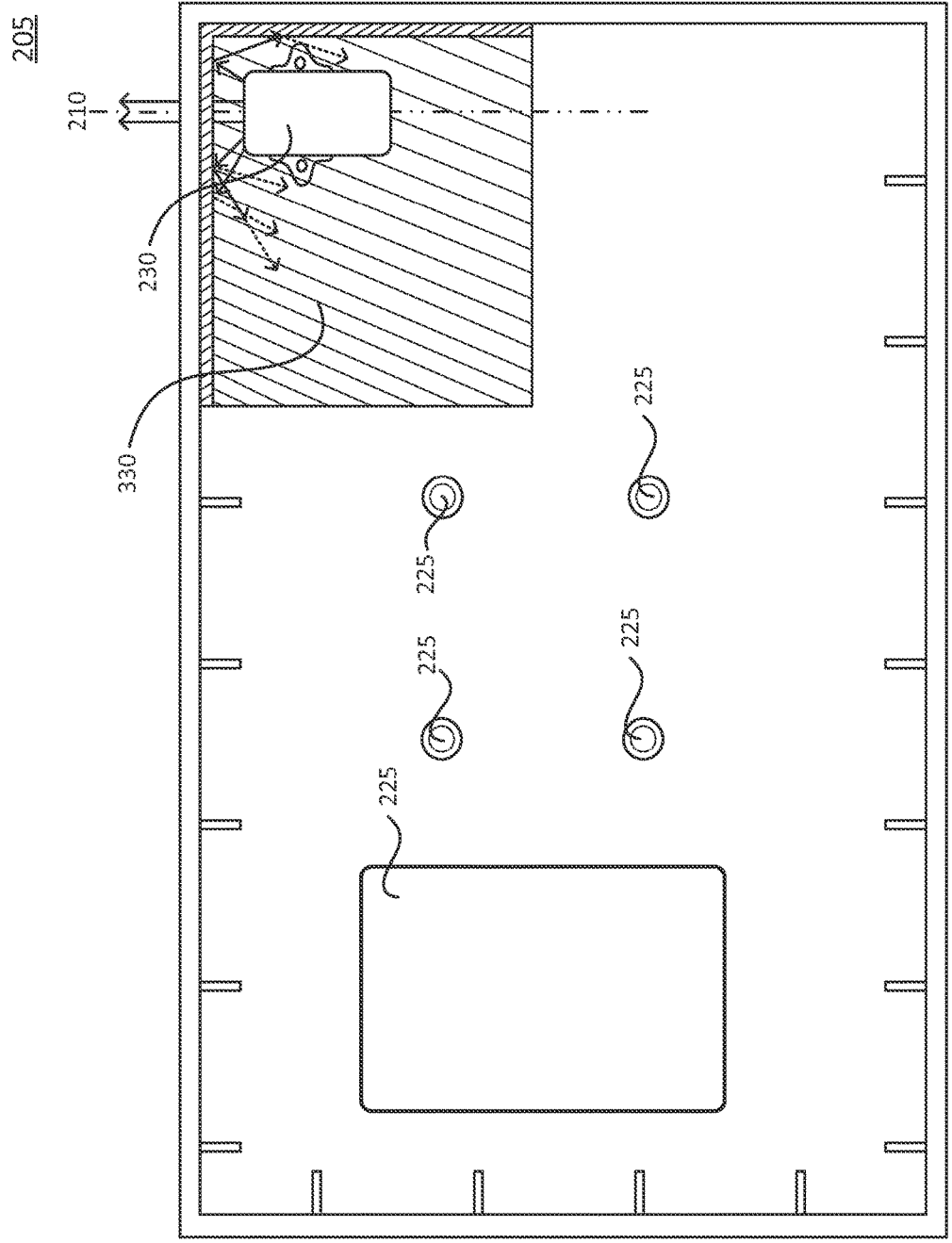
FIG. 4 is a top plan view of the bottom portion of the device assembly shown in FIG. 3, showing light emitted from a light source.

FIG. 4 is a top plan view of bottom portion 205, showing light emitted by light source 230. As mentioned above, light source 230 is preferably positioned proximate egress portion 210. Light emitted by light source 230 passes through bottom portion 205 according to egress portion 210. However, some light emitted from light source 230 may project outside of egress portion 210 (e.g., outside of the area of permissible light transmission). As shown, light emitted from light source 230 outside of egress portion 210 is inhibited from propagating or dissipating through the housing by light dissipation layer 330. That is, light dissipation layer 330 attenuates or dissipates errant light emitted from light source 230 outside of the area of permissible light transmission.

Figure 5:
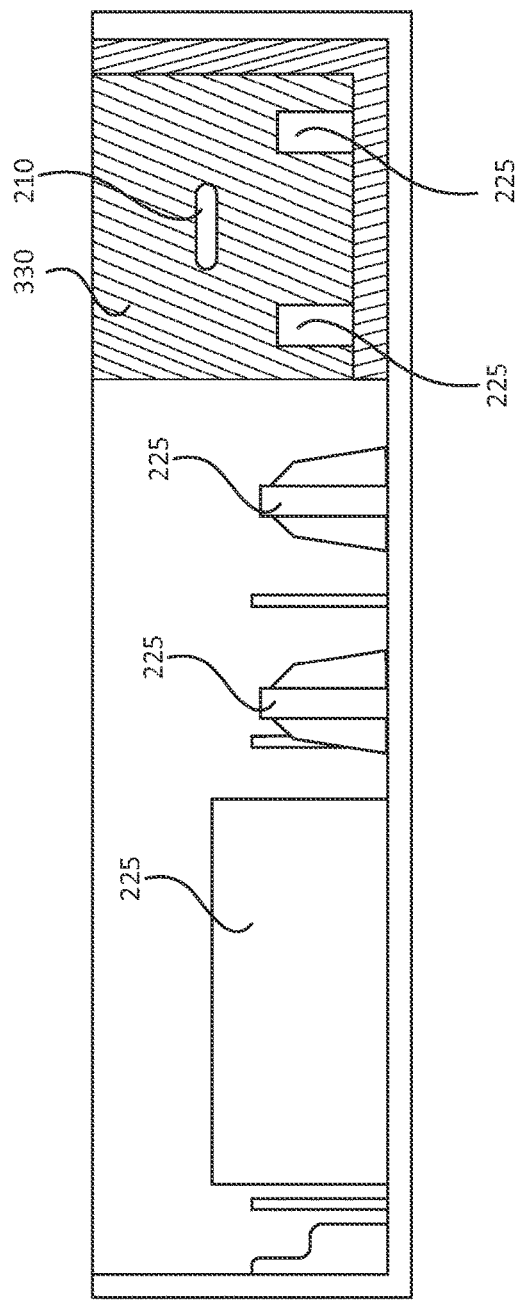
FIG. 5 is a cut sectional view of the bottom portion of the device assembly shown in FIG. 3, viewed at cut lines 5-5.

FIG. 5 is a cut sectional view of bottom portion 205, viewed at cut lines 5-5 shown in FIG. 2. As shown, light dissipation layer 330 forms an additional layer along the interior of bottom portion 205 and proximate to egress portion 210. In this fashion, light dissipation layer 330 prevents light bleed near egress portion 210. In alternative embodiments, discussed below, light dissipation layer 330 may also be formed integral with the housing—e.g., formed integral with top portion 105, bottom portion 205, or combinations thereof.

The above discussed light dissipation layer 330 is shown with respect to bottom portion 205. It is appreciated that a light dissipation layer corresponding to top portion 105 may also be employed to inhibit light emitted from light source 230 outside of the area of permissible light transmission.

In particular, FIG. 6A, illustrates an isometric perspective view of top portion 105, showing a light dissipation layer 630 formed proximate to egress portion 110 and egress portion 115. Light dissipation layer 630 may compliment light dissipation layer 330, and/or light dissipation layer 630 may be used in lieu of light dissipation layer 330.

Light dissipation layer 630, like light dissipation layer 330, may include an additional layer of plastic material, and is preferably placed proximate egress portion 110. Further, light dissipation layer 630 may be formed from a plastic material having a higher opacity than other portions of the housing. Moreover, in some embodiments, light dissipation layer 630 may be formed integral with top portion 105.

As discussed above, top portion 105 further includes egress portion 115 that defines an additional area for permissible light transmission. As shown, egress portion 115 is a negative mask formed in the plastic material of top portion 105 and light dissipation layer 630. For example, referring to FIG. 6B, a cut sectional view of bottom portion 105, viewed at cut lines 6B-6B of FIG. 6A, particularly shows the negative mask formed in portions of light transmission layer 630 and top portion 105.

As shown, the negative mask defines a gap or opening in light dissipation layer 630 and further defines an area of reduced thickness for top portion 105. Conventionally, such area of reduced thickness for the housing may be undesirable because it may result in light bleed through the housing, as discussed above. However, light dissipation layer 630 cooperates with egress portion 115 to permit targeted and specific light bleed through the housing—here, according to the negative mask (e.g., in the shape of the LOGO). In this fashion, when light source 230 emits light within the housing light bleed is permitted according to the negative mask and illuminates the pattern defined by the negative mask. In some embodiments, the negative mask may define an area of reduced thickness for light dissipation layer 630, instead of a gap. Further, other known techniques for forming the negative mask can be used in conjunction with light dissipation layer 630 and/or top portion 105, as is appreciated by those skilled in the art.

Figure 7:
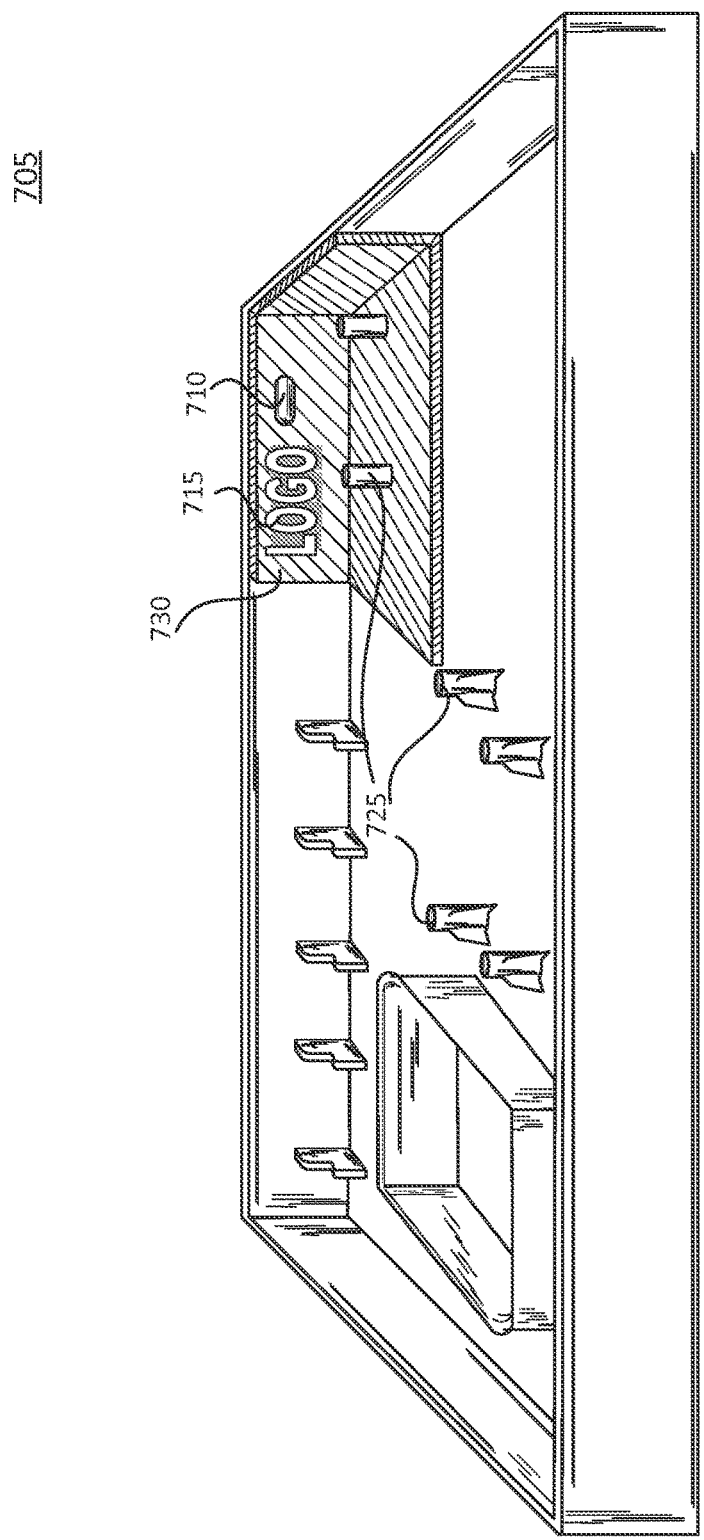
FIG. 7 is an isometric perspective view of a bottom portion of the device assembly according to another embodiment of this disclosure.

In some embodiments, the negative mask may also define one or more egress portions for bottom portion 205. For example, FIG. 7 is an isometric perspective view of a bottom portion 705, showing egress portion 715 defined by a negative mask, according to another embodiment of this disclosure.

Bottom portion 705, similar to bottom portion 205, defines one or more mounts 725 that secure electronic components (e.g., electronic components 220), a light source (e.g., light source 230), and the like. Bottom portion 705 further includes a light dissipation layer 730, similar to light dissipation layers 330 and 630. As shown, bottom portion 705 also includes egress portions—namely, egress portion 710 and egress portion 715—that define areas of permissible light transmission through the housing.

Egress portion 715 is particularly defined by a negative mask, similar to the negative mask defining egress portion 115. As discussed above, the negative mask permits targeted and specific light bleed through the housing—here, through bottom portion 705. Such targeted light bleed is particularly shown in FIG. 8.

Figure 8:
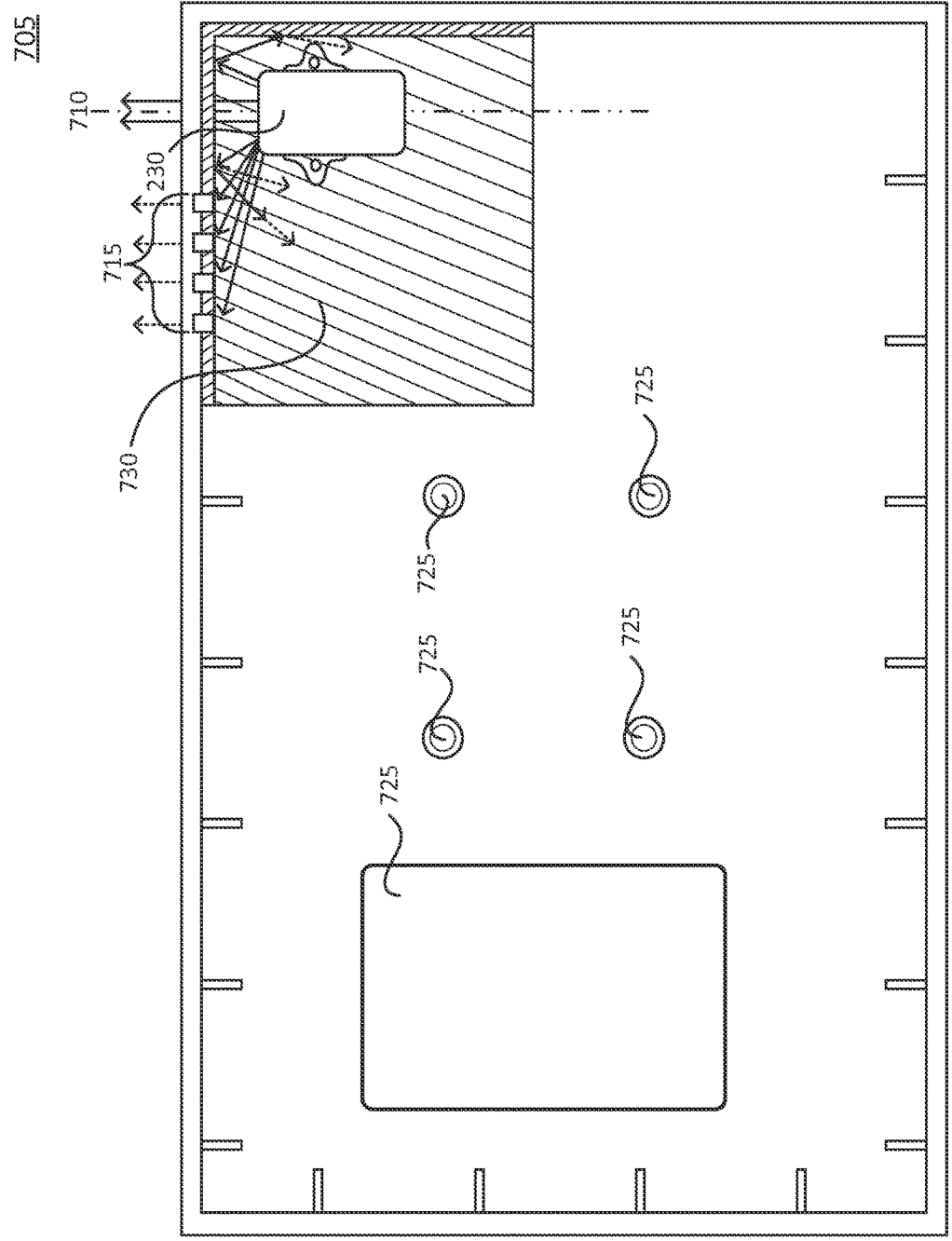
FIG. 8 a top plan view of the bottom portion of the electronic device assembly shown in FIG. 8, showing light emitted from the light source.

FIG. 8 is a top plan view of bottom portion 705, showing light emitted from light source 230 through egress portion 710 and egress portion 715. Notably, the negative mask defining egress portion 715 defines a gap in light dissipation layer 730 and an area of reduced thickness for bottom layer 705. As shown, light emitted from light source 230 passes through egress portion 710 and also dissipates or bleeds through the housing (e.g., bottom portion 705) according to the negative mask of egress portion 715.

FIGS. 9A and 9B illustrate a top portion 905 of a device assembly, showing a light dissipation layer 930 integrally formed with top portion 905, according to another embodiment of this disclosure. In particular, FIG. 9A is an isometric perspective view of top portion 905, and FIG. 9B is a cut sectional view of top portion 905 shown in FIG. 9A, viewed at cut lines 9B-9B. As discussed above, the light dissipation layer—here, light dissipation layer 930—may be formed integral with the housing—here, top portion 905. Various known plastic manufacturing techniques can be employed to integrate the light dissipation layer with the housing. For example, pigment may be introduced at various stages of the plastic processing in a specified light dissipation area to form the light dissipation layer, the light dissipation layer may be separately formed from the housing, but coupled or fused with the housing at a subsequent step, and other manufacturing techniques. Further, although light dissipation layer 930 is shown as integral with top portion 905, in other embodiments, light dissipation layer 930 may be formed integral with a corresponding bottom portion.

Figure 10:
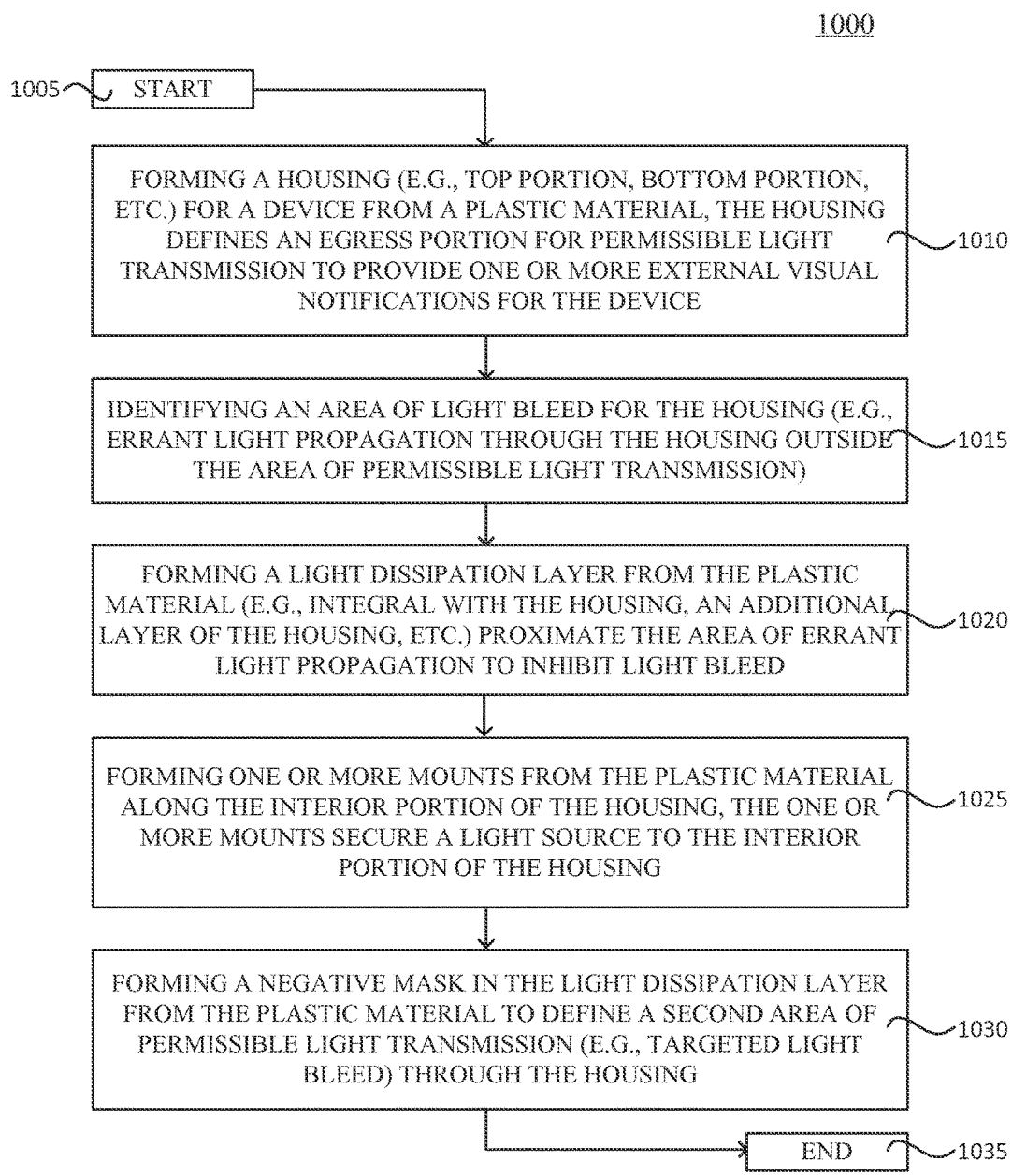
FIG. 10 illustrates an example simplified procedure for forming a device assembly according to one or more embodiments disclosed herein.

FIG. 10 illustrates an example simplified procedure for forming a device assembly (e.g., device assembly 100) in accordance with one or more embodiments described herein. Procedure 1000 may start at step 1005, and continue to step 1010, where, as described in greater detail above, a housing is formed, including a top portion and a bottom portion, from a plastic material. The housing may define one or more egress portions for permissible light transmission to provide one or more external visual notifications for the device assembly. For example, as discussed above, the egress portion can be defined in one or both of the bottom portion and/or the top portion. The egress portion can further include a gap and/or a negative mask. Notably, the egress portion defines an area of permissible light transmission from an interior portion of the housing through an exterior portion of the housing.

Next, in step 1015, procedure 1000 identifies an area of light bleed for the housing. As discussed above, light bleed includes errant light propagation through the housing outside the area of permissible light transmission (here, outside of the egress portion(s)).

Procedure 1000 continues to step 1020 where a light dissipation layer is formed from the plastic material. The light dissipation layer may be formed integral with other portions of the housing, or it may be formed as an additional layer of plastic material. The light dissipation layer is preferably disposed proximate the area of errant light propagation to inhibit light bleed for the device assembly. As discussed above, the light dissipation layer inhibits, attenuates, dissipates, blocks, or otherwise mitigates the errant light propagation through the housing. For example, the light dissipation layer may be formed from a plastic material having a high opacity relative to the housing, and/or the light dissipation layer may be formed with a specified thickness to facilitate light dissipation.

Optionally, one or more mounts may be formed in the housing, shown in step 1025. The mounts can, for example, secure electronic components as well as a light source (e.g., a LED light source).

Further, in some embodiments, an additional egress portion may be formed in the light dissipation layer as well as the housing, shown in step 1030. In particular, this additional egress portion may include a negative mask that defines a second area of permissible light transmission and particularly facilitates targeted light bleed through the housing (e.g., illuminating a logo, or predetermined design).

Procedure 1000 subsequently ends at step 1035, but may continue on to step 1010 to form the housing, discussed above.

It should be noted that while certain steps within procedures 1000 may be optional as described above, the steps shown in FIG. 10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, reduce light dissipation such as light bleed for electronic devices and device assemblies. In particular, the techniques provide a light dissipation layer that prevent unwanted light transmission through a housing for the device assembly. For example, as discussed above, the light dissipation layer may be formed from an opaque plastic material to attenuate or inhibit such unwanted light transmission. Moreover, the light dissipation layer can include a negative mask to provide targeted light bleed in certain portions of the housing (e.g., to illuminate a company logo). In this fashion, the techniques disclosed herein leverage existing plastic manufacturing techniques to overcome light bleed issues without requiring costly and complex manual processes. In addition, these techniques support a wider range of (translucent) plastic materials when forming a housing for respective devices.

While there have been shown and described illustrative embodiments that mitigate or attenuate light bleed for device assemblies, it is to be understood that various other adaptations and modifications may be made within the spirit and scope of the embodiments herein. Indeed, the foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as a software process being stored on a tangible (non-transitory) computer-readable medium, devices, and memories (e.g., disks/CDs/RAM/EEPROM/etc.) having program instructions executing on a computer, hardware (e.g., processor(s)), firmware, or a combination thereof. Further, methods describing the various functions and techniques described herein can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. In addition, devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example. Instructions, media for conveying such instructions, computing resources for executing them, and other structures for supporting such computing resources are means for providing the functions described in these disclosures. Accordingly this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method, comprising:
forming a housing for a device from a plastic material, the housing defines an area of permissible light transmission from an interior portion of the housing through an exterior portion of the housing to provide one or more visual notifications for the device, the interior portion of the housing formed with a uniform thickness with one area of the housing formed with a reduced thickness to define the area of permissible light transmission; and
forming a light dissipation layer from the plastic material proximate the area of permissible light transmission to inhibit light propagation through the housing outside the area of permissible light transmission.

2. The method of claim 1, further comprising:
identifying an area of the housing corresponding to light propagation through the housing outside the area of permissible light transmission,
wherein forming the light dissipation layer further comprises forming the light dissipation layer from the plastic material in the area of the housing corresponding to light propagation through the housing outside the area of permissible light transmission.

3. The method of claim 1,
wherein forming the housing for the device from the plastic material further comprises forming a first layer of the housing including at least one egress portion that defines the area of permissible light transmission, and
wherein forming the light dissipation layer from the plastic material further comprises forming a second layer of the housing.

4. The method of claim 3, wherein the first layer of the housing corresponds to a first opacity, and the second layer of the housing corresponds to a second opacity greater than the first opacity.

5. The method of claim 1,
wherein forming the housing for the device from the plastic material further comprises forming the housing for the device from a plastic material having a first opacity, and
wherein forming the light dissipation layer form the plastic material further comprises forming the light dissipation layer from a plastic material having a second opacity greater than the first opacity.

6. The method of claim 1, wherein forming the light dissipation layer from the plastic material proximate the area of permissible light transmission further comprises:
forming the light dissipation layer from the plastic material to substantially surround the area of permissible light transmission.

7. The method of claim 1, further comprising:
forming one or more mounts from the plastic material along the interior portion of the housing, the one or more mounts secure a light source to the interior portion of the housing proximate the area of permissible light transmission.

8. The method of claim 7, wherein the light source includes a light emitting diode (LED).

9. The method of claim 1, further comprising:
forming a negative mask in the light dissipation layer from the plastic material to define a second area of permissible light transmission from the interior portion of the housing through the exterior portion of the housing.

10. The method of claim 1, wherein forming the light dissipation layer from the plastic material proximate the area of permissible light transmission further comprises:
forming the light dissipation layer along at least one of the interior portion of the housing or the exterior portion of the housing.

11. A device assembly, comprising:
a housing formed from a plastic material, the housing defines at least one egress portion for permissible light transmission from an interior of the housing through an exterior of the housing to provide visual notifications for the device assembly via light frequency, light sequence, and light color; and
a light dissipation layer formed from the plastic material proximate the at least one egress portion that inhibits light propagation through the housing outside the egress portion.

12. The device assembly of claim 11, wherein the housing comprises a first layer of the plastic material and the light dissipation layer comprise a second layer of the plastic material.

13. The device assembly of claim 12, wherein the first layer of the plastic material has a first opacity and the second layer of the plastic material has a second opacity greater than the first opacity.

14. The device assembly of claim 11, wherein the light dissipation layer is unitarily formed with the housing, wherein the light dissipation layer has a greater opacity than the at least one egress portion.

15. A device, comprising:
a housing formed from a plastic material, the housing defining at least one egress portion for light transmission from an interior of the housing through an exterior of the housing to provide one or more visual notifications of the device, the at least one egress portion defining an area of reduced thickness in the housing for the light transmission, and
a light dissipation layer formed from the plastic material proximate the at least one egress portion that inhibits light propagation through the housing outside the egress portion.

16. The device assembly of claim 15, wherein the light dissipation layer has a higher density than at least one of a portion of the interior of the housing or a portion of the exterior of the housing.

17. The device assembly of claim 11, wherein the light dissipation layer substantially surrounds the at least one egress portion.

18. The device assembly of claim 11, further comprising:
one or more mounts formed from the plastic material along a portion of the interior of the housing; and
a light source secured by the one or more mounts proximate an area of the permissible light transmission, the light source emits light proximate the area of the permissible light transmission.

19. The device assembly of claim 11, further comprising:
a negative mask of a predetermined pattern formed in the light dissipation layer that defines a second egress portion for the permissible light transmission from the interior of the housing through the exterior of the housing.

20. The method of claim 1, wherein the visual notifications for the device assembly are provided via light frequency, light sequence, and/or light color of a light source.

* * * * *